(12) United States Patent
Staudigel et al.

(10) Patent No.: US 9,643,536 B2
(45) Date of Patent: May 9, 2017

(54) LIGHT-EMITTING COMPOSITE ARRANGEMENT AND METHOD FOR MANUFACTURING THE LIGHT-EMITTING COMPOSITE ARRANGEMENT

(71) Applicant: DIEHL AIRCABIN GMBH, Laupheim (DE)

(72) Inventors: Norbert Staudigel, Neu-Ulm (DE); Eckhard Steffen, Burgthann (DE); Oleg Graf, Illertissen (DE)

(73) Assignee: DIEHL AIRCABIN GMBH, Laupheim (DE)

( * ) Notice: Subject to any disclaimer, the term of this patent is extended or adjusted under 35 U.S.C. 154(b) by 6 days.

(21) Appl. No.: 14/809,806

(22) Filed: Jul. 27, 2015

(65) Prior Publication Data

US 2016/0031368 A1    Feb. 4, 2016

(30) Foreign Application Priority Data

Jul. 29, 2014  (DE) .................. 10 2014 011 170

(51) Int. Cl.
  *B60Q 3/02*     (2006.01)
  *B64D 11/00*    (2006.01)

(52) U.S. Cl.
  CPC .............. *B60Q 3/02* (2013.01); *B60Q 3/025* (2013.01); *B60Q 3/0283* (2013.01); *B64D 11/00* (2013.01); *B60Q 2500/10* (2013.01); *B64D 2011/0038* (2013.01); *Y02T 50/46* (2013.01)

(58) Field of Classification Search
  CPC ........ B60Q 3/02; B60Q 3/025; B60Q 3/0283; B64D 11/00; B64D 2011/0038
  See application file for complete search history.

(56) References Cited

U.S. PATENT DOCUMENTS

| | | |
|---|---|---|
| 4,794,373 A | 12/1988 | Harrison |
| 2007/0247842 A1 | 10/2007 | Zampini et al. |
| 2009/0059609 A1 | 3/2009 | Marshall et al. |
| 2012/0040599 A1 | 2/2012 | Hesselbach et al. |

FOREIGN PATENT DOCUMENTS

| | | |
|---|---|---|
| DE | 3720371 A1 | 1/1989 |
| DE | 198 11 076 A1 | 9/1999 |
| DE | 202004009805 U1 | 8/2004 |
| DE | 102006008385 A1 | 8/2007 |
| DE | 102006015449 A1 | 10/2007 |
| DE | 102010034028 A1 | 2/2012 |
| EP | 1 933 086 A1 | 6/2008 |

*Primary Examiner* — Thomas M Sember
(74) *Attorney, Agent, or Firm* — Scully Scott Murphy and Presser

(57) ABSTRACT

A light-emitting composite arrangement for stationary arrangement in an interior of an aircraft is provided. The light-emitting composite arrangement has a base layer, a covering layer and a core portion at least partially provided between the base layer and the covering layer. The covering layer can be a prepreg layer. A lighting device is integrated in the core portion. The covering layer is cured with the lighting device integrated in the core portion.

14 Claims, 2 Drawing Sheets

LIGHT-EMITTING COMPOSITE ARRANGEMENT AND METHOD FOR MANUFACTURING THE LIGHT-EMITTING COMPOSITE ARRANGEMENT

BACKGROUND OF THE INVENTION

The invention relates to a light-emitting composite arrangement for stationary arrangement in an interior of an aircraft, comprising a base layer and a covering layer, wherein the covering layer is a prepreg layer, comprising a core portion, which is arranged, at least in some areas, between the base layer and the upper covering layer, comprising at least one lighting device, which is integrated in the core portion.

DISCUSSION OF THE PRIOR ART

Interior lighting systems in aircraft serve to illuminate interior cabins and are here intended to create a lighting atmosphere for passengers which is as pleasant as possible. For the interior lighting, light-emitting diodes, for instance, are known as the illuminant.

For instance, printed publication DE 10 2006 008 385 A1, which probably represents the nearest prior art, describes a single-layer or multilayer plastics skin as a surface coating of coated articles. In the plastics skin are arranged regions in which the plastics skin has a switching, sensoring or signalling function. For instance, the regions having the switching, sensoring or signalling function are arranged on the outer surface of the plastics skin. The switching, sensoring or signalling elements are preferably configured in the form of foils.

SUMMARY OF THE INVENTION

The object of the invention is to provide a functionally improved light-emitting composite arrangement which is easy to manufacture.

A light-emitting composite arrangement for stationary arrangement in an interior of an aircraft is proposed. By stationary should be understood, in particular, a fixed arrangement in the interior. In particular, the light-emitting composite arrangement has a plurality of layers full-facedly connected to one another in layers in a composite. Particularly preferably, the light-emitting composite arrangement is a sandwich composite component having a plurality of sandwich layers.

The composite arrangement comprises a base layer and a covering layer. The covering layer is a prepreg layer. Optionally, the prepreg is a fibre composite material. Preferably, the prepreg is configured as a semi-finished product consisting of continuous fibres and an uncured duroplastic or thermoplastic plastic matrix. As continuous fibres, carbon fibres, alternatively, for instance, also glass fibres, basalt fibres or aramide fibres, are preferably processed. Optionally by way of supplement, the base layer is a prepreg layer. Advantages of prepregs are, on the one hand, the good formability during production and, on the other hand, as a mixed material, the higher-grade properties in comparison to single materials.

The composite arrangement comprises a core portion, which, at least in some areas, is arranged between the base layer and the covering layer. Particularly preferably, the core portion, the base layer and the covering layer form the sandwich layers of the composite arrangement as the sandwich composite component. The sandwich composite component obtains a significantly reduced weight compared to traditional components, due to the low density of the material at least partially used in the core portion and/or the used structural form, as well as adequate strength values, through a suitable selection of material for the covering layer.

The light-emitting composite arrangement comprises at least one lighting device, configured as a light source, which is integrated in the core portion. By a light source should be understood a body designed to emit mainly visible light, which is generated by the conversion of energy with the aid of the body. In particular, the at least one lighting device is configured to emit light into the aircraft interior of the aircraft. By integration should be understood, in particular a captive fixing, more specifically the prevention of a non-destructive removal of the at least one lighting device.

For instance, the lighting device is a lighting display, in particular a seating display on a cabin wall, a passenger guidance system display, a so-called starry sky display, and/or a lighting device for the lighting in the interior of the aircraft.

Preferably, the base layer forms a bottom side, in an installation situation in particular a side of the composite arrangement that is facing away from the interior. For instance, the base layer is suitable and/or configured for direct or indirect arrangement on a bearing structure in the aircraft. In the installation situation, the covering layer is, in particular, a side which directly or indirectly faces towards the interior. In particular, the light emission of the at least one lighting device occurs via and/or in the direction of the covering layer.

Within the scope of the invention, it is proposed that the covering layer is cured with the lighting device integrated in the core portion. Optionally by way of supplement, the base layer, in particular as the prepreg layer, is cured with the lighting device integrated in the core portion. The integration of the lighting device thus takes place during manufacture, in particular during pressing of the layers of the composite arrangement. More specifically, no subsequent attachment of the at least one lighting device to the finished, already cured composite arrangement takes place.

It is of advantage that, as a result of the integration of the at least one lighting device during manufacture of the light-emitting composite arrangement, in particular during pressing of the layers, otherwise necessary production steps, such as the milling-out of a receiving fixture for the lighting device, the insertion of the lighting device into the receiving fixture and the fastening of the lighting device in the receiving fixture are eliminated. Savings can thereby be made in terms of work time and associated costs. It is additionally of advantage that the lighting device, due to the integration in the core section, is fixed, and thus a housing for the lighting device can be dispensed with. In addition, it is advantageous that the lighting device integrated in the core portion is fully functional and, at the same time, has positive optical properties.

In a preferred embodiment, the core portion comprises a supporting core or is formed by this. Preferably, the supporting core makes contact with the base layer and/or covering layer, at least in some areas. Particularly preferably, the supporting core is integrally connected to the base layer and/or the covering layer. For instance, the supporting core is a foam core, but it is particularly preferred for this to be honeycomb core. For instance, the honeycomb core is made of a paper and/or board material. In particular, for the honeycomb core, a coated aramide paper is used. This has, in particular, advantages with regard to a reduced weight of the composite arrangement.

Preferably, the supporting core has at least one receiving region, in which the at least one lighting device is arranged. The receiving region has a shape and size of the lighting device and/or is tailored thereto. For instance, the receiving region is a recess, in particular a blind hole, in which the at least one lighting device is inserted. It is here preferred that the recess, in particular the blind hole, is facing the covering layer in order to receive the light output of the lighting device in the direction of the covering layer. Particular preferably, the receiving region is an aperture, so that the lighting device is preferably arranged directly or indirectly on the base layer.

In a preferred refinement, the receiving region is filled with a filler, in particular with an adhesive, so that the lighting device, at least in sections, is embedded in the adhesive. Thus the lighting device is fixed by the filler, in particular by the adhesive, in particular captively in the receiving region. For instance, the filler is an epoxy resin, particularly preferably a splice adhesive. The splice adhesive is constituted, in particular, by an adhesive which foams or expands under heat and then hardens. Apart from for the secure fixing of the at least one lighting device, the filler, in particular the adhesive, proves advantageous for, for instance, correcting an offset between a plurality of lighting devices and unevennesses or similar, so that a smoothed surface is provided. Furthermore, the heat which is introduced to cure the covering layer and, optionally by way of supplement, the base layer can be utilized to harden the splice adhesive. For this, it is provided in particular that the splice adhesive and the covering layer, and optionally the base layer, complete their reaction at the same introduced warming temperature. Thus the hardening of the splice adhesive, and consequently the fixing of the lighting device, can take place parallel to the curing of the covering layer and, optionally by way of supplement, the base layer. In this way, the energy demand and the number of production steps are reduced.

It is preferred that the lighting device, at least in sections, terminates flush with an adhesive surface that closes off the receiving region. The adhesive surface is formed by the filler, in particular the adhesive. Thus the emitted light can be projected unhindered by the filler. As an alternative embodiment, the filler covers the lighting device, in particular fully. It is here preferred that the filler, at least for partial light transmission, is translucent or transparent.

It is possible for the cover layer to extend both over the supporting core and over the lighting device, and/or over the adhesive surface covering the receiving region. In order in this design embodiment to still receive the light output of the emitted light of the at least one lighting device, it can be provided that the covering layer, at least in the region of the lighting device, is light-transmitting. By "light transmittance" should be understood a light transmission of at least 50 percent, in particular of at least 80 percent. In a particularly preferred design realization however, the covering layer comprises at least one recess for the lighting device arranged in the receiving region. In particular, the recess has a size, in particular a shape, an area and/or circumference which enables unhindered light output of the emitted light of the lighting device. The shape, the area and/or the circumference can here be chosen other than or smaller than that of the lighting device, so that the possibility of installing the lighting device via the recess is precluded. As a result of the recess, a loss of light which would otherwise ensue as a result of the covering layer is avoided.

In addition, it is preferred that the lighting device embedded in the filler, in particular the adhesive, terminates flush with a top side of the covering layer. In particular, the top side of the covering layer is the side facing away from the supporting core. In particular, for the flush closure, the adhesive surface and/or the top side of the covering layer are stopped and/or ground. Thus remnants of the stopper or grinding marks are possibly discernible under the microscope.

The covering layer as the prepreg layer generally has a purely functional surface design. If the recess is present, the lighting device and/or the adhesive surface, moreover, is/are not covered by the covering layer and would thus be exposed. In the light of this, it is preferably provided that the light-emitting composite arrangement comprises an outer layer, which is arranged on the covering layer, on the lighting device and/or on the adhesive surface that closes off the receiving region. The previously described flush closure of the lighting device embedded in the adhesive with the top side of the covering layer advantageously enables a uniform, reliable overlay of the covering layer. In particular, the outer layer is a visible side of the light-emitting composite arrangement arranged in the aircraft. Particularly preferably, the outer layer forms a decorative and/or protective layer of the composite arrangement. Optionally, the outer layer serves as contact protection for the at least one lighting device. As a result, reliable operation of the at least one lighting device can advantageously be ensured. The outer layer conceals the purely functional configuration of the individual components, so that an attractive appearance of the light-emitting composite arrangement is realized.

In a preferred refinement, the outer layer is light-transmitting, so that the light transmission of the light emitted by the lighting device, via the outer layer, is enabled. In addition, it is particularly preferred that the outer layer is translucent, thus, in particular, light-transmitting, yet at least partially opaque. This leads to a situation in which, looking at the outer layer, the at least one lighting device, in the switched-off state, is not or only barely discernible, and thus the light-emitting composite arrangement acts for passengers like a simple wall. In the switched-on state of the lighting device, however, the light emission occurs via the outer layer. Consequently, the at least one lighting device becomes recognizable only once it is in operation. In this way, an unobtrusive appearance of the light-emitting composite arrangement is obtained.

In one possible design embodiment, the outer layer is a lacquer, a film, a glass and/or a lacquered or coated glass. These embodiments enable an uncomplicated application, in particular imprinting, spreading, vapour-coating, gluing, of the outer layer onto the covering layer and, optionally by way of supplement, onto the lighting device and/or the adhesive surface. In particular, furthermore, the appearance and/or feel of the light-emitting composite arrangement can be improved and the durability increased.

In a particularly improved realization of the invention, the light-emitting composite arrangement comprises an electric connection cable for supplying current to the at least one lighting device. In particular, the electric connection cable is arranged, at least in some areas, between the base layer and the supporting core. Preferably, the electric connection cable, at least in some areas, is connected directly or indirectly, in particular bonded, to the base layer and/or to the supporting core. Particularly preferably, the lighting device, when integrated into the core portion, is fixedly, in particular non-detachably connected to the connection cable, so that these are arranged as one during the production of the composite arrangement. The fixed connection ensures a reliable electrical connection. As a result of the arrangement of the electrical connection cable between the base layer and the supporting core, a subsequent introduction of the lighting device is not possible. For instance, the electrical connection cable is a plug-in connection, though preferably a strip conductor, particularly preferably a printed circuit board. Preferably, the electrical connection cable, in particular the printed circuit board, is larger than the aperture and/or than the recess, so that a the possibility of installing the printed circuit board via this is precluded. Optionally, the at least one lighting device comprises the electrical connection cable.

For instance, the at least one lighting device or the light source is a surface irradiator. Particularly preferably, the at least one lighting device or the light source is an LED. It is here possible that the LED is an OLED. In the case of a plurality of LED's, it can be provided that these are configured as an LED board or as an LED strip, in particular with the electrical connection cable.

From the design structure aspect, it is preferred that the covering layer and/or the base layer have flat, curved and/or bent portions as the prepreg layer. The prepreg layer is configured flexibly as a semi-finished product, so that the prepreg layer can be produced both flat and bent, curved or in some other free form, in particular can be pressed. In this way, it is possible for the light-emitting composite arrangement to adapt to freely curved surfaces. Thus various installation situations can be served with the light-emitting composite arrangement, whereby the variability and/or the integration capability of the light-emitting composite arrangement is increased.

In a preferred embodiment of the invention, the composite arrangement is an aircraft panel. Preferably, the aircraft panel, at least in sections, is a cladding component or fittings component of the aircraft. For instance, the aircraft panel can line inner sides of the aircraft interior. In this function, it can be a floor, ceiling and/or wall cladding of the interior of the aircraft. Alternatively, or optionally by way of a supplement, the aircraft panel can form a constituent part of the interior fittings of the aircraft. In particular, the aircraft panel can be a seat paneling or a side wall of an overhead locker of the aircraft. Thus the light-emitting composite arrangement is constituted not only by a lighting interior element, but also additionally by a cladding interior element in the aircraft.

A method for manufacturing the light-emitting composite arrangement, as previously described, relates to a further subject of the invention. In one step, the base layer and the covering layer, the core portion and the at least one lighting device are provided. In a following step, the at least one lighting device is integrated into the core portion.

For the integration of the at least one lighting device, it is preferred that the at least one receiving region is introduced into the supporting core, into which the lighting device is arranged, in particular inserted. The receiving region can be a blind hole or an aperture. In the case of the blind hole, the lighting device is preferably inserted into this. Preferably, in a follow-up step, the core portion, in particular the supporting core, is arranged between the base layer and the cover layer. In the case of the aperture, it is in particular provided that the lighting device is firstly arranged onto the base layer, whereupon the supporting core is placed directly or indirectly onto the base layer and thus the lighting device is arranged in the receiving region. Following this, the receiving region is filled with the adhesive in order to at least partially embed the lighting device in the receiving region and thus fix it in particular captively.

For the manufacture of the composite arrangement, the covering layer, and optionally by way of supplement the base layer, is/are cured in the assembled state with the core portion, and thus with the lighting device integrated in the core portion, whereby the composite of the composite arrangement is produced. In particular, the base layer and covering layer, as well as the core portion, are arranged in a pressing tool and warmed there. As a result of the warming, the plastics matrix of the covering layer and, optionally by way of supplement, that of the base layer is/are at least partially melted under the pressure prevailing in the pressing tool, so that these connect integrally to the supporting core. Next the composite arrangement is cooled, so that, after sufficient solidification, and thus hardening, the composite arrangement can be removed from the mould.

In production engineering terms, it is particularly advantageous if the adhesive surface covering the receiving region, following curing of the covering layer, is stopped and/or ground flush with the covering layer, so that, for example, unevennesses are at least partially eliminated and thus a suitable bearing surface and/or contact surface is created. In a following production step, the outer layer is applied, for instance glued, vapour-coated or sprayed, onto the covering layer.

BRIEF DESCRIPTION OF THE DRAWINGS

Further features, advantages and effects of the invention emerge from the following description of a preferred illustrative embodiment of the invention, wherein.

In the figures, mutually corresponding or same parts are respectively provided with the same reference symbols.

DETAILED DESCRIPTION OF THE INVENTION

Figure 1:
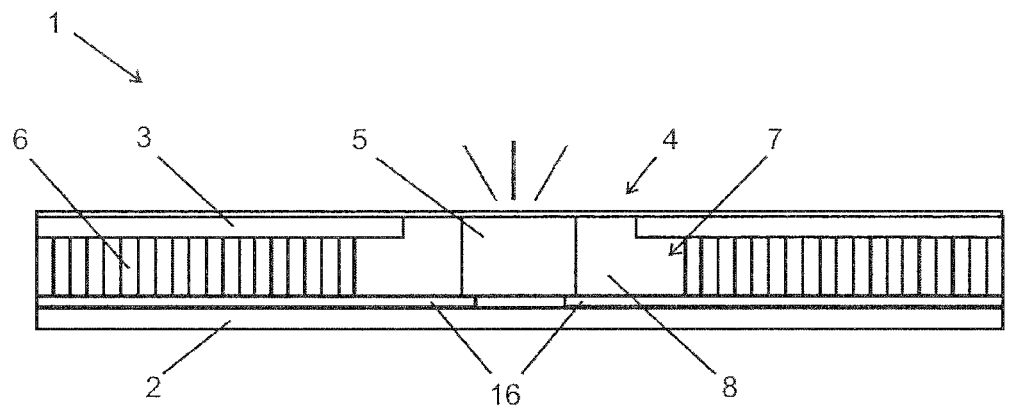
FIG. 1 shows a cross section of a basic structure of a light-emitting composite arrangement comprising a base layer, a core portion and a covering layer, wherein a lighting device is integrated in the core portion.

FIG. 1 shows a cross section through a light-emitting composite arrangement 1 for stationary arrangement in an interior of an aircraft, wherein a sectional line runs parallel to a longitudinal extent of the light-emitting composite arrangement 1. For instance, the composite arrangement 1 is an aircraft panel, wherein the aircraft panel is configured as a cladding component for lining of the interior and/or as a fittings component for furnishing of the interior.

The light-emitting composite arrangement 1 comprises a base layer and a covering layer 2, 3. For instance, the base layer 2 forms a bottom side, in an installation situation a side of the composite arrangement 1 that is facing away from the interior. The covering layer 3 and optionally the base layer 2 are in each case a prepreg layer. The prepreg is constituted, in particular, by a duroplastic or thermoplastic component reinforced with continuous fibres.

In addition, the composite arrangement 1 has a core portion 4, which in some areas is arranged between the base layer and the covering layer 2, 3. In the manufacture of the composite arrangement 1, the base layer 2, the core portion 4 and the covering layer 3 are placed one upon another and are pressed together to form a sandwich structure.

The light-emitting composite arrangement 1 comprises a lighting device 5, configured as a light source, for emitting light into the interior of the aircraft, a plurality of lighting devices 5 also being possible. The lighting device 5 is integrated in the core portion 4 and in this way captively fixed. The light of the lighting device 5 is emitted in the direction of the covering layer 3. In this illustrative embodiment, the lighting device 5 is an LED.

The covering layer 3 is cured with the lighting device 5 integrated in the core portion 4. In this way, the production and assembly complexity is reduced, since, for instance, an introduction of a receiving fixture for the lighting device 5, the subsequent installation of the lighting device 5, as well as of the associated electrics, is avoided.

The core portion 4 has a supporting core 6, which in this illustrative embodiment is a honeycomb core. The supporting core 6 obtains a high mechanical stiffness combined with comparatively low weight. The supporting core 6 is integrally connected, at least in some areas, to the base layer and the covering layer 2, 3.

The supporting core 6 has a receiving region 7, in which the lighting device 5 is integrated. In this illustrative embodiment, the receiving region 7 is configured as an aperture. It can equally be provided, however, that the receiving region 7 is a blind hole or the aperture is formed by a plurality of mutually spaced supporting cores 6.

The core portion 4 comprises an adhesive 8, with which the receiving region 7 is filled. The lighting device 5 is thus embedded in the adhesive 8. The adhesive 8 is, for instance, a splice adhesive. The lighting device 5 terminates flush with an adhesive surface that closes off the receiving region 7. However, it can equally be provided that the adhesive 8 fully covers the lighting device 5. In this case, the adhesive 8 shall be configured translucently or transparently, at least for partial light transmission.

The covering layer 3 comprises a recess 9 for the lighting device 5 arranged in the receiving region 7, so that a light emission, unhindered by the covering layer 3, of the lighting device 5 is possible. The lighting device 5 embedded in the adhesive 8 terminates flush with a top side of the covering layer 3. For the flush termination and in order to eliminate possible unevennesses in the adhesive surface covering the receiving region 7, this, and optionally the top side of the covering layer 3, is stopped and/or ground.

The light-emitting composite arrangement 1 comprises an outer layer 10, which is arranged on the covering layer 3, the lighting device 5 and the adhesive surface and forms the visible side of the composite arrangement 1. The outer layer 10 is applied for the purpose of improving the appearance, for insulation, for contact protection of the lighting device 5 and/or for protection of the top side of the covering layer 3. For instance, the outer side 10 is a lacquer.

The outer layer 10 is light-transmitting, so that the light transmission of the light emitted by the lighting device 5 is enabled via the outer layer 10. In addition, the outer layer 10 is translucent, so that, although the light emission is enabled, a look into the lighting device 5 is not or only limitedly allowed. The outer layer 10 thus procures an unobtrusive appearance of the lighting device 5 in the light-emitting composite arrangement 1.

The light-emitting composite arrangement 1 comprises an electric connection cable 16 for connecting the lighting device 5 to a voltage source of the aircraft. This cable runs, at least in some areas, between the base layer 2 and the supporting core 6. The electric connection cable 16 is configured as a strip conductor and is connected in an electrically conductive manner to contacts of the lighting device 5, for example soldered to the contacts.

Figure 2:
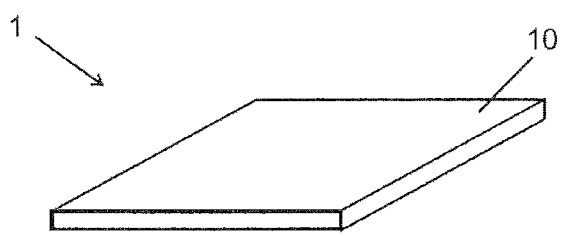
FIG. 2 shows a three-dimensional representation of a visible side of the light-emitting composite arrangement from FIG. 1, with the lighting device, integrated in the core portion, in the switched-off state.
Figure 3:
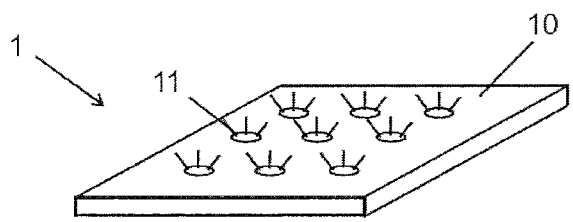
FIG. 3 shows the three-dimensional representation of the visible side of the light-emitting composite arrangement from FIG. 1, with the lighting device, integrated in the core portion, in the switched-on state.

FIGS. 2 and 3 show a three-dimensional representation of a visible side of the light-emitting composite arrangement 1 from FIG. 1, with a plurality of lighting devices 5 integrated in the core portion 4.

In FIG. 2, the lighting devices 5 are in a switched-off state and thus not in operation. As a result of the translucent configuration of the outer layer 10, the lighting devices 5 cannot be seen or can be seen only with difficulty. In FIG. 3, by contrast, the lighting devices 5 are in a switched-on state. As a result of the light transmission of the outer layer 10, a light contour 11 is portrayed on the outer layer 10 by the light decoupled on the outer layer 10. The light contour 11 corresponds, for instance, to the light emission contour of the lighting device 5. Should the light emission contour, for instance, be annular, the portrayed light contour 11 is likewise annular.

Figure 4:
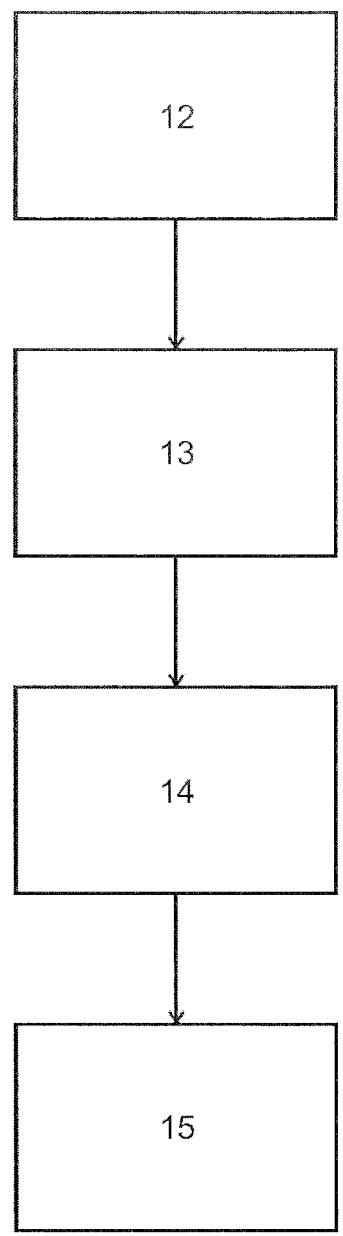
FIG. 4 shows a schematic process flow of a method for producing the light-emitting composite arrangement from FIG. 1.

In FIG. 4, a schematic process flow of a method for manufacturing the light-emitting composite arrangement 1 is represented. The method comprises the following steps:

12: Provision of the base layer and covering layer 2, 3 of the core portion 4, as well as of the at least one lighting device 5;

13: Integration of the at least one lighting device 5 into the core portion 4;

14: Arrangement of the core portion 4 between the base layer and the covering layer 2, 3;

15: Curing of the covering layer 3, and optionally by way of supplement, of the base layer 2.

REFERENCE SYMBOL LIST 1 light-emitting composite arrangement
2 base layer
3 covering layer
4 core portion
5 lighting device
6 supporting core
7 receiving region
8 adhesive
9 recess
10 outer layer
11 light contour
12 first method step
13 second method step
14 third method step
15 fourth method step
16 electric connection cable

What is claimed is:

1. A light-emitting composite arrangement for stationary arrangement in an interior of an aircraft, comprising:
   a base layer and a covering layer, wherein the covering layer is a prepreg layer;
   a core portion, which is at least partially arranged between the base layer and the covering layer; and
   at least one lighting device, configured as a light source, which is integrated in the core portion,
   wherein the covering layer is cured with the at least one lighting device integrated in the core portion, wherein the core portion comprises a supporting core having at least one receiving region, the at least one lighting device being arranged in the at least one receiving region, wherein the covering layer further comprises at least one recess corresponding to the at least one lighting device arranged in the receiving region, such that a light emission of the at least one lighting device is unhindered by the covering layer, wherein the at least one lighting device is partially embedded in an adhesive and terminates at a tot surface of the at east one lighting device, wherein the top surface of the at least one lighting device is flush with a top surface of the covering layer.

2. The light-emitting composite arrangement according to claim 1, wherein the at least one receiving region of the supporting core is filled with the adhesive, such that the at least one lighting device is at least partially embedded in the adhesive.

3. The light-emitting composite arrangement according to claim 1, further comprising an outer layer, which is arranged on the top surface of the covering layer and the top surface of the at least one lighting device.

4. The light-emitting composite arrangement according to claim 3, wherein the outer layer is slight-transmitting.

5. The light-emitting composite arrangement according to claim 3, wherein the outer layer is translucent.

6. The light-emitting composite arrangement according to claim 3, wherein the outer layer comprises at least one of a lacquer, a film and a glass.

7. The light-emitting composite arrangement according to claim 1, further comprising an electric connection cable for supplying current to the at least one lighting device, wherein the electric connection cable is at least partially arranged between the base layer and the supporting core.

8. The light-emitting composite arrangement according to claim 1, wherein the at least one lighting device is an LEI).

9. The light-emitting composite arrangement according to claim 1, wherein the covering layer is partially curved and/or bent.

10. The light-emitting composite arrangement according to claim 1, wherein the light-emitting composite arrangement is an aircraft panel.

11. A method for manufacturing the light-emitting composite arrangement according to claim 1, comprising:
providing the base layer, the covering layer, the core portion, and the at least one lighting device;
integrating the at least one lighting device into the core portion;
arranging the core portion between the base layer and the covering layer; and
curing the covering layer.

12. The method according to claim 11,
wherein the at least one lighting device is arranged into the receiving region of the supporting core, wherein the receiving region is filled with the adhesive.

13. The method according to claim 11,
wherein following curing of the covering layer, the outer layer is applied to the top surface of the covering layer.

14. A light-emitting composite arrangement for stationary arrangement in an interior of an aircraft, comprising:
a base layer and a covering layer, wherein the covering layer is a prepreg layer;
a core portion, which is at least partially arranged between the base layer and the covering layer; and
at least one lighting device, configured as a light source, which is integrated in the core portion,
wherein the covering layer is cured with the at least one lighting device integrated in the core portion,
wherein the core portion comprises a supporting core having at least one receiving region, the at least one lighting device being arranged in the at least one receiving region,
wherein the at least one receiving region of the supporting core is filled with an adhesive, such that the at least one lighting device is fully embedded in the adhesive,
wherein the adhesive terminates at a top surface thereof, wherein the top surface of the adhesive is flush with a top surface of the covering layer, and
wherein the adhesive is transparent or translucent.

* * * * *